US008819552B2

(12) United States Patent
Park et al.

(10) Patent No.: US 8,819,552 B2
(45) Date of Patent: Aug. 26, 2014

(54) METHOD OF EXECUTING FUNCTION ON STANDBY SCREEN OF MOBILE TERMINAL

(75) Inventors: Chan Woo Park, Seoul (KR); Soon Ok Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 903 days.

(21) Appl. No.: 11/928,634

(22) Filed: Oct. 30, 2007

(65) Prior Publication Data
US 2008/0126994 A1 May 29, 2008

(30) Foreign Application Priority Data

Nov. 27, 2006 (KP) .................. 10-2006-0117749

(51) Int. Cl.
*G06F 3/00* (2006.01)
*G06F 3/048* (2006.01)

(52) U.S. Cl.
USPC .................................. 715/716; 715/846

(58) Field of Classification Search
CPC ............................ G06F 3/0482; G06F 3/048
USPC .................................. 715/716, 846
See application file for complete search history.

(56) References Cited

U.S. PATENT DOCUMENTS

| | | | | |
|---|---|---|---|---|
| 5,295,062 A | * | 3/1994 | Fukushima | 700/83 |
| 5,365,360 A | | 11/1994 | Torres | |
| 5,586,237 A | * | 12/1996 | Baecker et al. | 345/670 |
| 5,886,697 A | * | 3/1999 | Naughton et al. | 345/473 |
| 5,896,133 A | * | 4/1999 | Lynch et al. | 715/784 |
| 6,160,554 A | * | 12/2000 | Krause | 715/804 |
| 6,453,078 B2 | * | 9/2002 | Bubie et al. | 382/305 |
| 6,570,597 B1 | * | 5/2003 | Seki et al. | 715/835 |
| 6,918,091 B2 | | 7/2005 | Leavitt et al. | |
| 7,086,011 B2 | * | 8/2006 | Budrys et al. | 715/837 |
| 7,503,009 B2 | * | 3/2009 | Peters | 715/764 |
| 7,730,425 B2 | * | 6/2010 | de los Reyes et al. | 715/835 |
| 8,543,940 B2 | * | 9/2013 | Singhal et al. | 715/809 |
| 8,659,767 B2 | * | 2/2014 | Iwase et al. | 358/1.13 |

(Continued)

FOREIGN PATENT DOCUMENTS

| | | |
|---|---|---|
| CN | 1555520 | 12/2004 |
| EP | 0 542 660 | 5/1993 |

(Continued)

OTHER PUBLICATIONS

Muran, Ruth. Maran Illustrated Microsoft Windows XP Course Technology PTR Jan. 1, 2005 pp. 51-54, 57, and 61.*
Rob Griffiths, "Mac OS X Power Hound, Second Edition", Published Sep. 24, 2004, Second edition, Chapter 2: pp. 1-25 (see attached).*

*Primary Examiner* — David Phantana Angkool
(74) *Attorney, Agent, or Firm* — The Farrell Law Firm, P.C.

(57) ABSTRACT

A method of executing a function on a standby screen of a mobile terminal capable of executing various functions on a standby screen by selecting a function icon displayed on the standby screen is provided. The method of executing a function on a standby screen of a mobile terminal includes displaying at least one function icon on the standby screen; selecting a displayed function icon; displaying a preview of a function connected to the selected function icon on the standby screen; and executing the function connected to the preview by selecting the preview. Therefore, the user can easily and quickly execute a function connected to a function icon on the standby screen by selecting the function icon, so that provision of a dedicated key can be minimized.

17 Claims, 10 Drawing Sheets

(56) References Cited

U.S. PATENT DOCUMENTS

| | | | |
|---|---|---|---|
| 8,687,211 B2* | 4/2014 | Mitsui et al. | 358/1.13 |
| 2002/0060701 A1 | 5/2002 | Naughton et al. | |
| 2003/0043206 A1* | 3/2003 | Duarte | 345/810 |
| 2003/0081011 A1 | 5/2003 | Sheldon et al. | |
| 2003/0084096 A1* | 5/2003 | Starbuck et al. | 709/203 |
| 2005/0251748 A1* | 11/2005 | Gusmorino et al. | 715/713 |
| 2006/0026523 A1* | 2/2006 | Kitamaru et al. | 715/708 |
| 2006/0036568 A1* | 2/2006 | Moore et al. | 707/1 |
| 2006/0101350 A1 | 5/2006 | Scott | |
| 2007/0038642 A1* | 2/2007 | Durgin et al. | 707/10 |

FOREIGN PATENT DOCUMENTS

| | | |
|---|---|---|
| FR | 2 756 393 | 5/1998 |
| KR | 100320733 | 1/2002 |
| KR | 102002096247 | 12/2002 |
| KR | 100574045 | 4/2006 |
| KR | 1020060105806 | 10/2006 |
| KR | 1020060106978 | 10/2006 |
| WO | WO 89/11696 | 11/1989 |
| WO | WO 03/023596 | 3/2003 |

\* cited by examiner

METHOD OF EXECUTING FUNCTION ON STANDBY SCREEN OF MOBILE TERMINAL

PRIORITY

This application claims priority under §35 U.S.C. 119(a) to an application entitled "METHOD OF EXECUTING FUNCTION ON STANDBY SCREEN OF MOBILE TERMINAL" filed in the Korean Intellectual Property Office on Nov. 27, 2006 and assigned Serial No. 2006-0117749, the contents of which are incorporated herein by reference.

BACKGROUND OF THE INVENTION

1. Field of the Invention

The present invention relates to a method of executing a function of a mobile terminal, and more particularly, to a method of executing a function on a standby screen of a mobile terminal capable of executing various functions on a standby screen by selecting a function icon displayed on the standby screen.

2. Description of the Related Art

Due to the development of technology, mobile terminals can use data related to programs by installing various application programs according to users' requests as well as providing voice communication services. The data includes personal information stored in a mobile terminals such as schedule management and details of Short Message Service (SMS) transmission and reception, data such as pictures and video generated using a camera provided in the mobile terminal, contents such as electronic books, characters such as people, animals, objects, and symbols appearing in comics, movies, paintings, books, and other visual media, ring tones, Moving Picture Experts Group (MPEG)-1 Audio Layer 3s (MP3s), and game downloaded from a server of a mobile communication provider, and programs. The mobile terminal may be one of a mobile communication terminal, a Personal Digital Assistant (PDA), and a Portable Multimedia Player (PMP).

However, in order for a user to access a desired function or information using the mobile terminal, several key inputs are required, whereby it is not easy for an inexperienced user to access necessary information.

In order to solve the problem, a dedicated key for directly executing a specific function may be provided, however it is impossible to provide dedicated keys for executing all functions necessary for the user in the mobile terminal. The dedicated keys provided in the mobile terminal are limited to executing specific functions such as digital broadcasting reception, a camera function, and MP3 playback.

Screen of display units are gradually becoming wider and achieving higher resolution. However, standby screens of display units are frequently used to display simple images such as pictures, animations, or a calendar.

SUMMARY OF THE INVENTION

The present invention has been made in an effort to solve the above problems, and the present invention provides a method of executing a function of a mobile terminal that enables easy and quick access to various functions of the mobile terminal on a standby screen.

The present invention further provides a method of executing a function of a mobile terminal that enables simultaneous execution of a plurality of functions on the standby screen.

The present invention further provides a method of executing a function of a mobile terminal that enables execution of a preview of a function to be executed on the standby screen.

The present invention further provides a method of executing a function of a mobile terminal by which a user can directly compose a standby screen.

In accordance with an aspect of the present invention, a method of executing a function on a standby screen of a mobile terminal includes displaying at least one function icon on the standby screen; selecting a displayed function icon; displaying a preview of a function connected to the selected function icon on the standby screen; and executing the function connected to the preview by selecting the preview.

The function icon may be related to a function of the mobile terminal, and have a shape of an item for decorating a room; and the standby screen may display a shape of the room decorated with the items corresponding to the function icons.

Selecting a displayed function icon includes selecting the function icon using a pointer displayed on the standby screen, and using a direction key moving a pointer between the function icons.

The standby screen may be displayed on a touch screen; and selecting a displayed function icon may include selecting the function icon by touching the touch screen.

Executing the function connected to the preview by selecting the preview includes converting from the standby screen to a function execution screen.

Each function icon may be connected to one of a function of digital broadcasting, an Moving Picture Experts Group (MPEG)-1 Audio Layer 3 (MP3) player, a radio, a camera, voice communication, text messaging, Global Positioning System (GPS) navigation, and a scheduler.

In accordance with another aspect of the present invention, a method of executing a function on a standby screen of a mobile terminal includes displaying the standby screen having at least one function icon; selecting a displayed function icon; displaying a preview of a function connected to the selected function icon on the standby screen; determining whether the preview or another function icon is selected on the standby screen; and if the preview is selected on the standby screen, converting from the standby screen to an execution screen of a function connected to the preview.

The method further includes if another function icon is selected on the standby screen, displaying a preview of a function connected to the newly selected function icon on the standby screen.

In accordance with another aspect of the present invention, a method of executing a function on a standby screen of a mobile terminal includes displaying the standby screen having at least one function icon; displaying a pointer on the standby screen; positioning the pointer at a function icon to be selected; selecting the function icon at which the pointer is positioned; displaying a preview of a function connected to the selected function icon on the standby screen; positioning the pointer at one of the preview or another function icon and selecting the preview or function item at the positioned pointer; and if the preview is selected on the standby screen, converting from the standby screen to an execution screen of a function connected to the preview.

The method further includes if another function icon is selected on the standby screen, displaying a preview of a function connected to the newly selected function icon on the standby screen.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
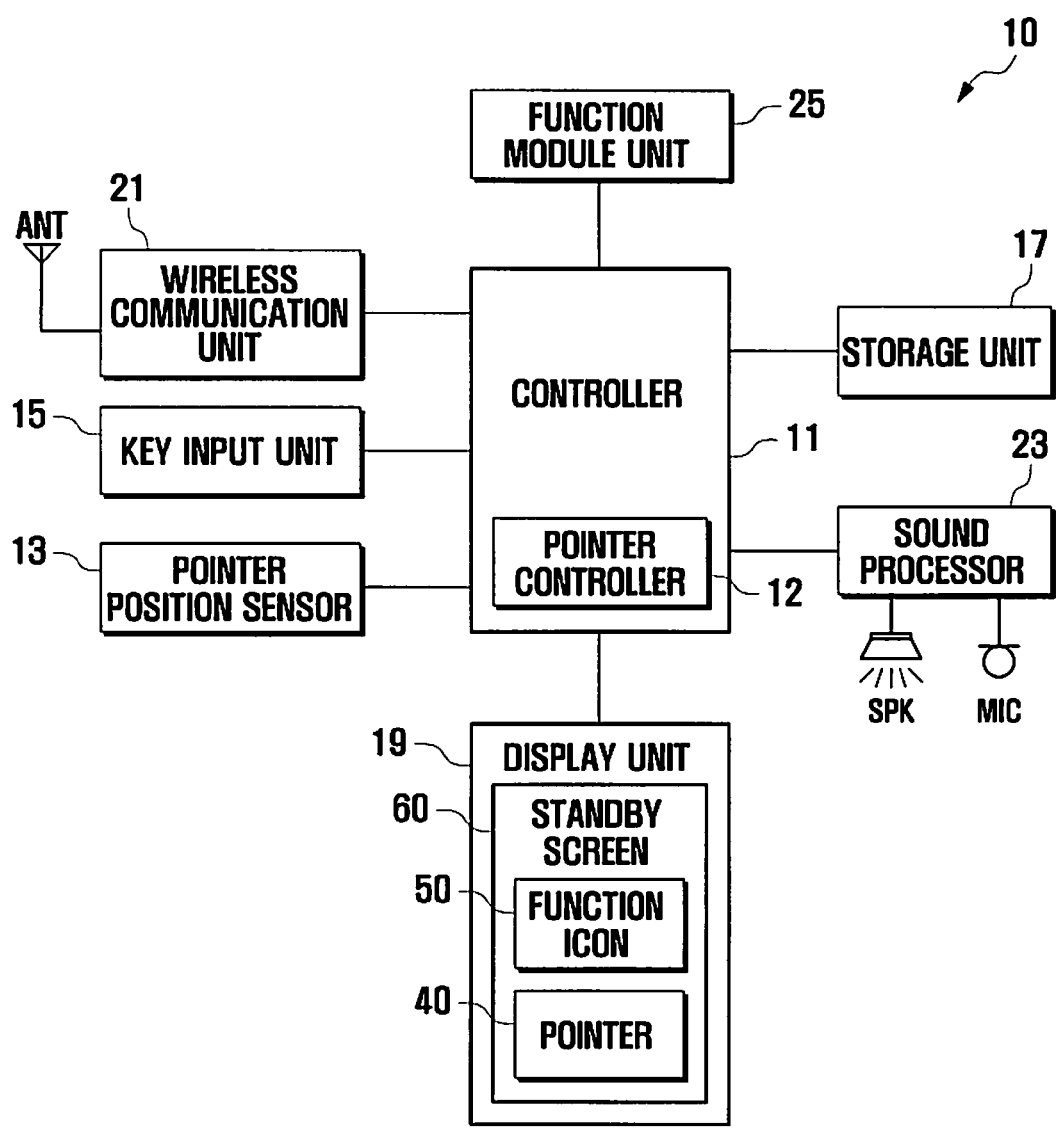
FIG. 1 is a block diagram illustrating a configuration of a mobile terminal according to an exemplary embodiment of the present invention.
Figure 2:
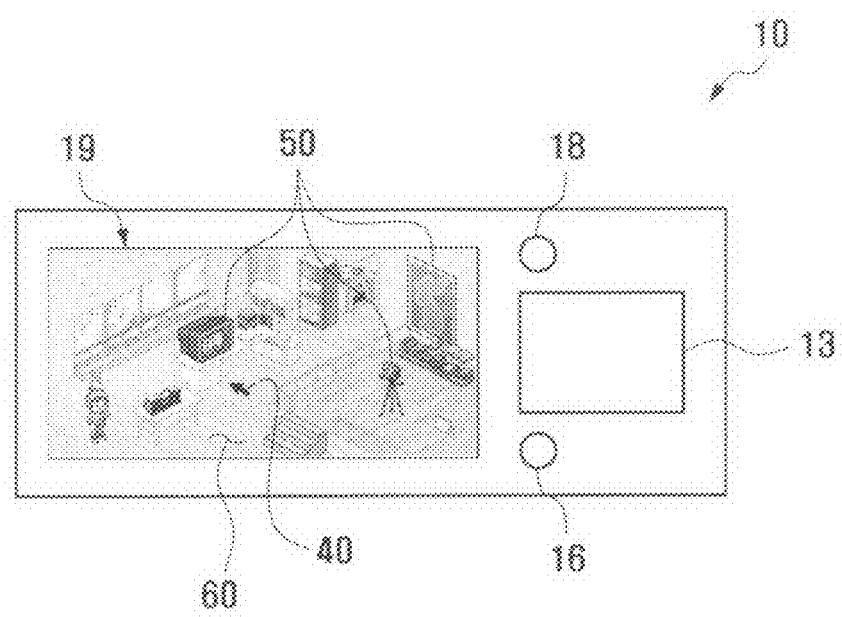
FIG. 2 is a plan view of a mobile terminal according to an exemplary embodiment of the present invention.

Referring to FIGS. 1 and 2, the mobile terminal 10 includes a controller 11, a pointer position sensor 13, a key input unit 15, a storage unit 17, a display unit 19, a wireless communication unit 21, a sound processor 23, and a function module unit 25. The controller 11 includes a pointer controller 12, and the display unit 19 includes a standby screen 60 in which a pointer 40 and a function icon 50 are displayed.

The controller 11 performs general control operations of the mobile terminal 10. The controller 11 controls setting and execution of the standby screen 60 including the function icon 50. The pointer controller 12 controls operation of the pointer 40 displayed on the standby screen 60.

The pointer position sensor 13 detects a position of the pointer 40 displayed on the standby screen 60 and outputs information of the position to the pointer controller 12. The pointer position sensor 13 further detects movement of a touch device such as a pen or a finger of a user and outputs information of the movement to the pointer controller 12. The pointer position sensor 13 may use a touch sensor for detecting the movement of the touch device. The pointer controller 12 displays the pointer 40 on the standby screen 60 by connecting the movement of the pointer 40 to the movement of the touch device transmitted from the pointer position sensor 13.

The key input unit 15 provides a plurality of keys for manipulating the mobile terminal 10, generates key data by key selection of the user, and outputs the data to the controller 11. When the pointer 40 is positioned at the function icon 50 to be selected by the user through the pointer position sensor 13, the function icon 50 is selected by a key input of the user through the key input unit 15. In this case, the pointer position sensor 13 is disposed at one side of the display unit 19 of the mobile terminal 10, and a confirmation key 16 and a cancellation key 18 of the key input unit 15 are each disposed at a side of the pointer position sensor 13. The confirmation key 16 is used as a key for selecting the function icon 50, and the cancellation key 18 is used as a key for canceling a preview to be executed on the standby screen 60 or for canceling a function execution screen. Displaying and hiding of the pointer 40 on the standby screen 60 are performed by key selection of the key input unit 15.

The storage unit 17 stores a program required for controlling operation of the mobile terminal 10 and data generated during performing the program. Specifically, the storage unit 17 stores a program for controlling setting and execution of the standby screen 60 and data generated while performing the program. The storage unit 17 stores the function icons 50 and image data to be used on the standby screen 60.

The display unit 19 displays various function menus executed in the mobile terminal 10 and data stored in the storage unit 17 using an image. Particularly, the display unit 19 displays the standby screen 60 including the function icon 50 and the pointer 40 for selecting the function icon 50 displayed on the standby screen 60. The display unit 19 displays a preview according to selection of the function icon 50 using the pointer 40 and displays an execution screen according to selection of the preview.

The wireless communication unit 21 modulates data output from the controller 11, and converts a frequency thereof, and transmits the resulting wireless signal through an ANTenna (ANT). The wireless communication unit 21 separates a reception signal from the wireless signal received through the antenna ANT, converts and decodes a frequency of the signal, and outputs the signal to the controller 11.

The sound processor 23 converts a sound input to a microphone MIC to digital data and outputs the data to the controller 11, and decodes sound data received through the wireless communication unit 21 and outputs the sound data through a SPeaKer SPK.

The function module unit 25 performs functions other than the communication function. The function module unit 25 may include at least one of a camera module, a digital broadcasting reception module, a Global Positioning System (GPS) module, Wireless BROadband (WiBro) module, a local area wireless communication module, an Moving Picture Experts Group (MPEG)-1 Audio Layer 3 (MP3) module, and a Radio Frequency IDentification (RFID) module. Various function modules that can be embodied in the mobile terminal 10 may be included in the function module unit 25.

If a specific function icon 50 displayed on the standby screen 60 is selected by the pointer 40, the controller 11 displays a preview of a function connected to the function icon 50 on the standby screen 60. If the preview is then selected by the pointer 40, the controller 11 converts the standby screen 60 to an execution screen of the function connected to the preview.

The mobile terminal 10 positions the pointer 40 at the function icon 50 to be selected using the pointer position sensor 13, and selects the function icon 50 by key input. However, a method of selecting the function icon 50 in the mobile terminal 10 is not limited thereto. For example, in a mobile terminal having a direction key moving the pointer between function icons, a function icon can be selected on the standby screen by manipulating the direction key. In a mobile terminal in which the display unit uses a touch screen, a function icon can be selected by directly touching a function icon displayed on the standby screen.

Figure 3:
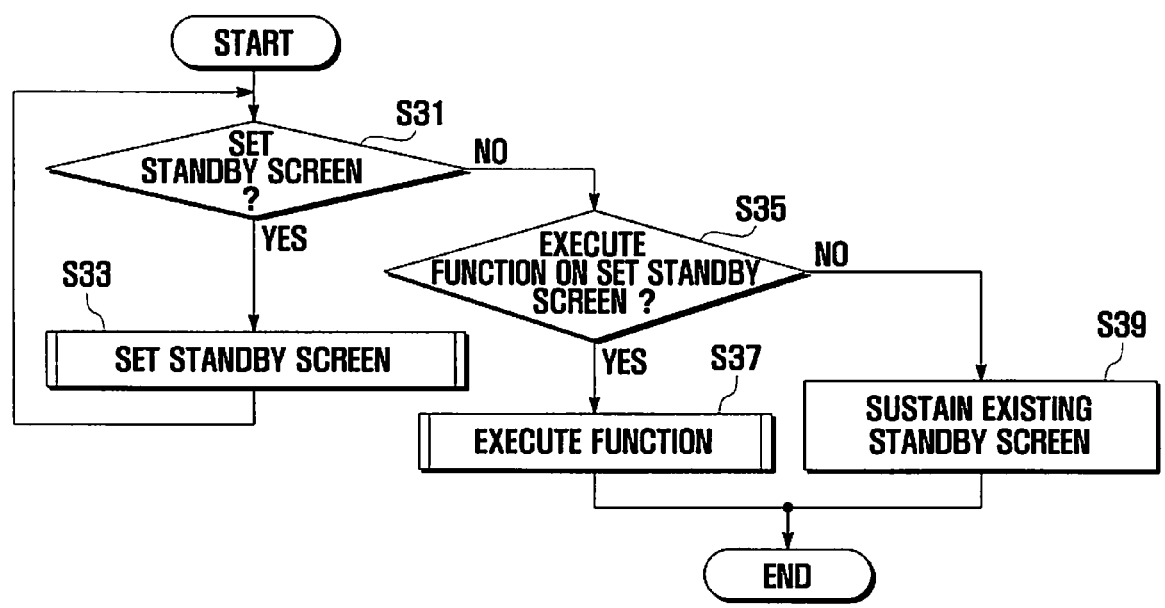
FIG. 3 is a flowchart illustrating a method of executing a function on a standby screen of a mobile terminal according to an exemplary embodiment of the present invention.

FIG. 3 is a flowchart illustrating a method of executing a function on a standby screen of a mobile terminal according to an exemplary embodiment of the present invention.

Referring to FIGS. 1 to 3, the controller 11 determines whether an input signal is for setting a standby screen, in step S31.

If an input signal is for setting a standby screen, the controller 11 sets a standby screen, in step S33, and the process returns to step S31.

If an input signal is not for setting a standby screen at step S31, the controller 11 determines whether an input signal is for executing a function on the set standby screen, in step S35.

If an input signal is for executing a function on the set standby screen, the controller 11 executes the function on the set standby screen, in step S37.

If an input signal is not for executing a function on the set standby screen, the controller 11 sustains the existing standby screen, in step S39. The signal input is performed through the pointer position sensor 13 or the key input unit 15.

Figure 4:
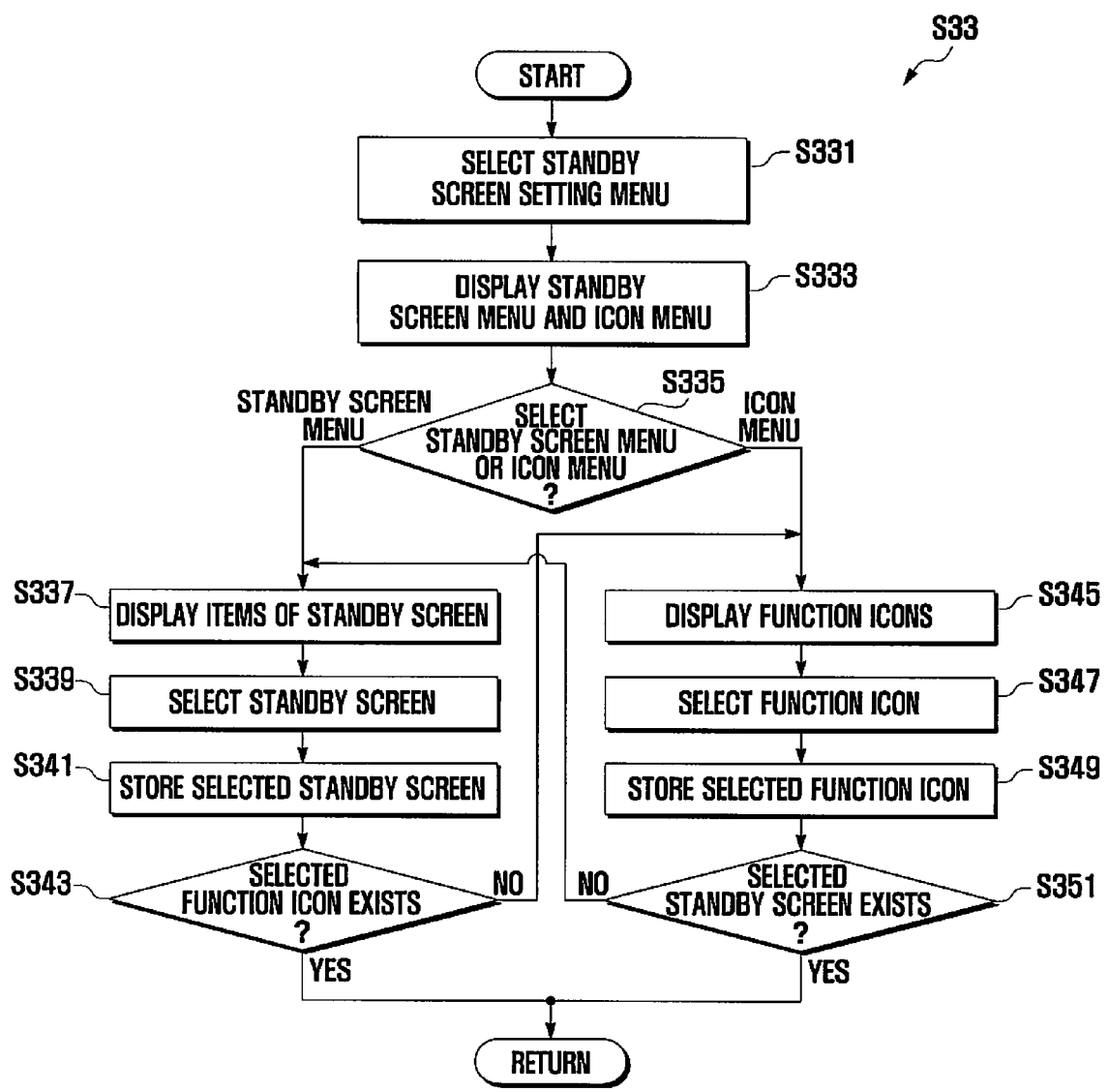
FIG. 4 is a flowchart illustrating a process of setting the standby screen in the method of FIG. 3.

FIG. 4 is a flowchart illustrating a process of setting the standby screen in the method of FIG. 3.

Referring to FIGS. 1 to 4, the process, in step S33, of setting a standby screen in a method of executing a function on a standby screen according to an exemplary embodiment of the present invention is described as follows.

A standby screen setting menu is selected by signal input, in step S331, and the controller 11 displays a standby screen menu and an icon menu in the display unit 19 for selection by the user, in step S333. The controller 11 then determines whether the standby screen menu or the icon menu is selected by user signal input, in step S335.

If the standby screen menu is selected, a process of selecting the standby screen 60 is performed, in steps S337 to S341. If the icon menu is selected, a process of selecting a function icon to be displayed on the standby screen 60 is performed, in steps S345 to S349.

If the standby screen menu is selected at step S335, the controller 11 displays items for the standby screen 60 in the display unit 19, in step S337.

The user selects the standby screen 60 among the displayed items for the standby screen 60 by key input, in step S339.

The controller 11 stores the selected standby screen 60, in step S341. Each item of the standby screen 60 is an image to be used on the standby screen 60, and in the present exemplary embodiment, the items may be images having shapes of various rooms.

The controller 11 determines whether a function icon that is selected exists on the standby screen, in step S343. If a function icon that is selected exists on the standby screen, the controller 11 ends the process of setting the standby screen 60. If a function icon that is selected does not exist on the standby screen, the controller 11 performs a process of selecting a function icon, in steps S345 to S349.

If the icon menu is selected at step S335, the controller 11 displays function icon items in the display unit 19, in step S345.

The user selects a function icon to be used among the displayed function icon items by key input, in step S347.

The controller 11 stores the selected function icon, in step S349.

Thereafter, the controller 11 determines whether a standby screen 60 that is selected exists, in step S351. If a standby screen 60 that is selected exists, the controller 11 ends the process of setting the standby screen 60. If a standby screen 60 that is selected does not exist, the controller 11 performs a process of selecting the standby screen 60, in steps S337 to S341.

Figure 6:
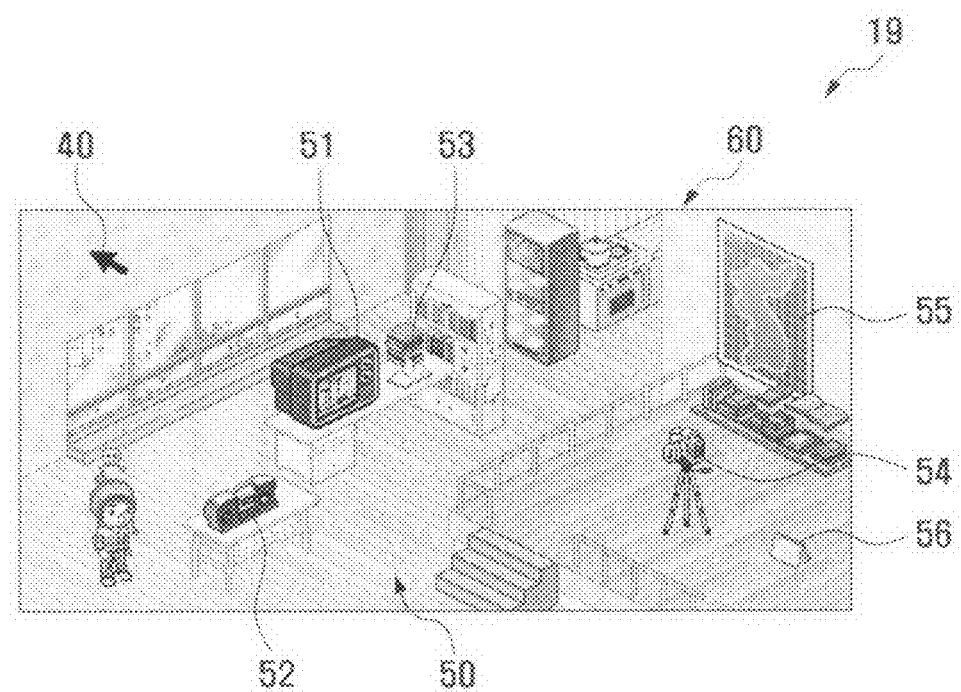
FIG. 6 is an example of a standby screen set in the process of FIG. 4.

FIG. 6 is an example of a standby screen set in the process of FIG. 4.

The set standby screen 60 can be embodied in a shape of a room, as shown in FIG. 6.

Here, the standby screen 60 is an image displaying the room, and the function icon 50 is embodied in an item for decorating the room. For example, the function icon 50 can include icons of a television 51, a radio 52, a book 53, a camera 54, a map 55, and a calendar 56. Each function icon 50 performs a function shown in Table 1.

TABLE 1

| Function icon | Function |
|---|---|
| Television | Digital broadcasting reception |
| Radio | FM radio reception |
| Book | Album, diary, or electronic dictionary |
| Camera | Digital camera |
| Map | GPS |
| Calendar | Scheduler |

The present exemplary embodiment illustrates an example in which all of the function icons 50 are displayed on the standby screen 60 displayed in the display unit 19, however the standby screen 60 may be too large to display satisfactorily in the display unit 19. In this case, only some of the function icons 50 are displayed on the standby screen 60 displayed in the display unit 19. A function icon that is not displayed in the display unit 19 can be displayed in the display unit 60 by moving the standby screen 60 using the pointer 40.

The process, in step S37, of executing a function on the standby screen 60 in a method of executing a function on a standby screen according to an exemplary embodiment of the present invention is described with reference to FIGS. 1, 2, 3, and 5 through 10.

Figure 5:
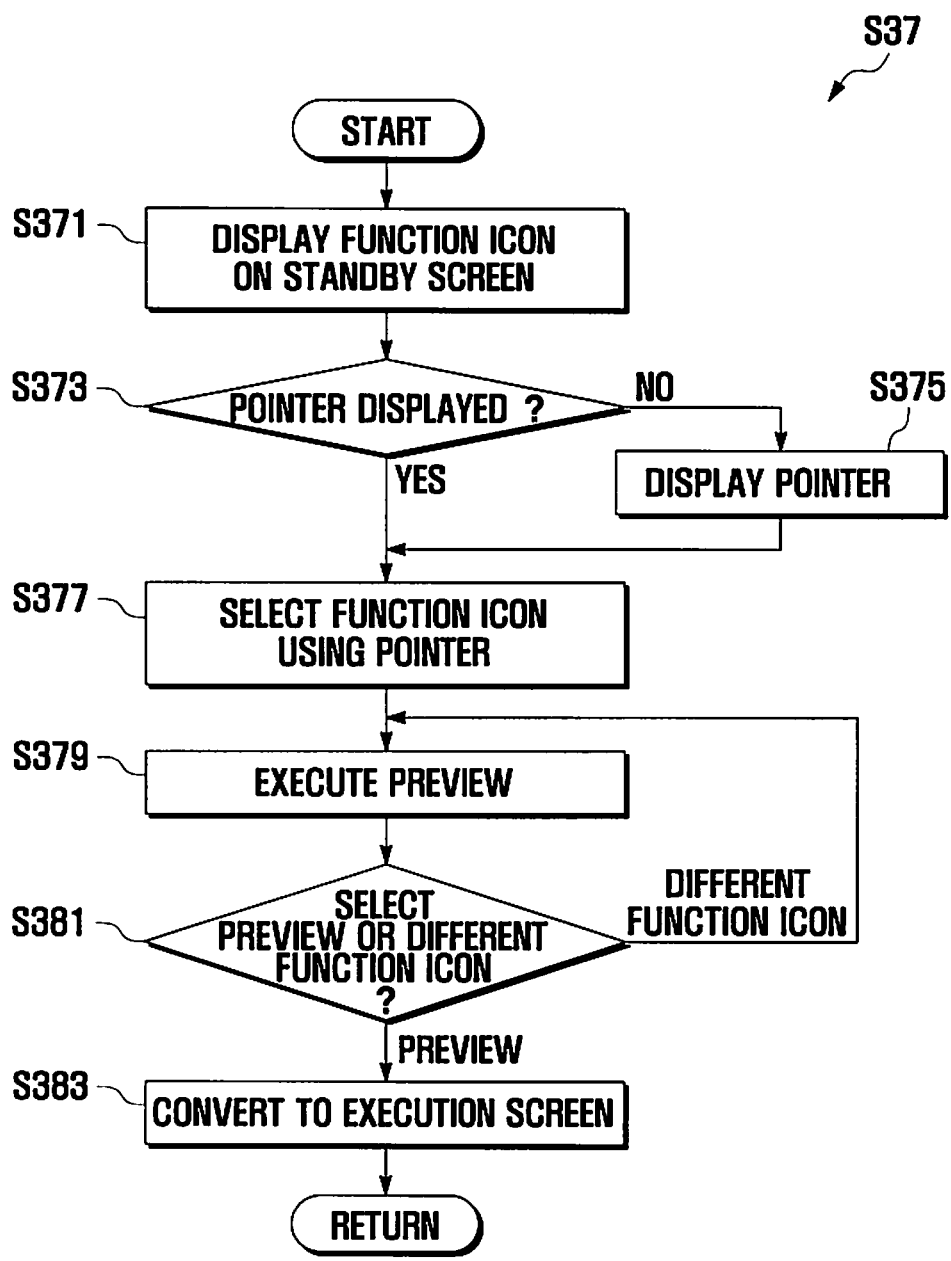
FIG. 5 is a flowchart illustrating a process of executing a function on the standby screen in the method of FIG. 3.

FIG. 5 is a flowchart illustrating a process of executing a function on the standby screen in the method of FIG. 3. FIGS. 7 to 10 are examples of screens illustrating the process of FIG. 5.

The standby screen 60 having the function icons 50 is displayed in the display unit 19, in step S371.

The controller 11 determines whether the pointer 40 is displayed on the standby screen 60, in step S373, and if the pointer 40 is not displayed on the standby screen 60, the pointer 40 may be displayed on the standby screen 60 through a key input from the user, in step S375.

Next, one of the function icons 50 is selected using the pointer 40, in step S377. That is, the pointer 40 is positioned at the function icon 50 to be selected by user input to the pointer position sensor 13, then the function icon 50 at which the pointer 40 is positioned is selected by input of the confirmation key 16.

The controller 11 executes a preview of a function connected to the selected function icon 50, in step S379. When the pointer 40 is positioned at the function icon 50, an explanation window connected to the function icon 50 may be displayed in a pop-up window form.

A preview displays a function to be executed that is connected to the function icon 50 on the standby screen 60, or summarizes data to be displayed by executing the function and displays the data on the standby screen 60. The preview is displayed on the standby screen 60. Preferably, the preview is displayed in an area having the selected function icon 50 at its center. The preview can be displayed in a Picture-In-Picture (PIP) or a pop-up window form. The function icons 50 are disposed on the standby screen 60 separated at a fixed interval so that at least a part of each function icon 50 that is not selected is displayed on the standby screen 60.

Figure 7:
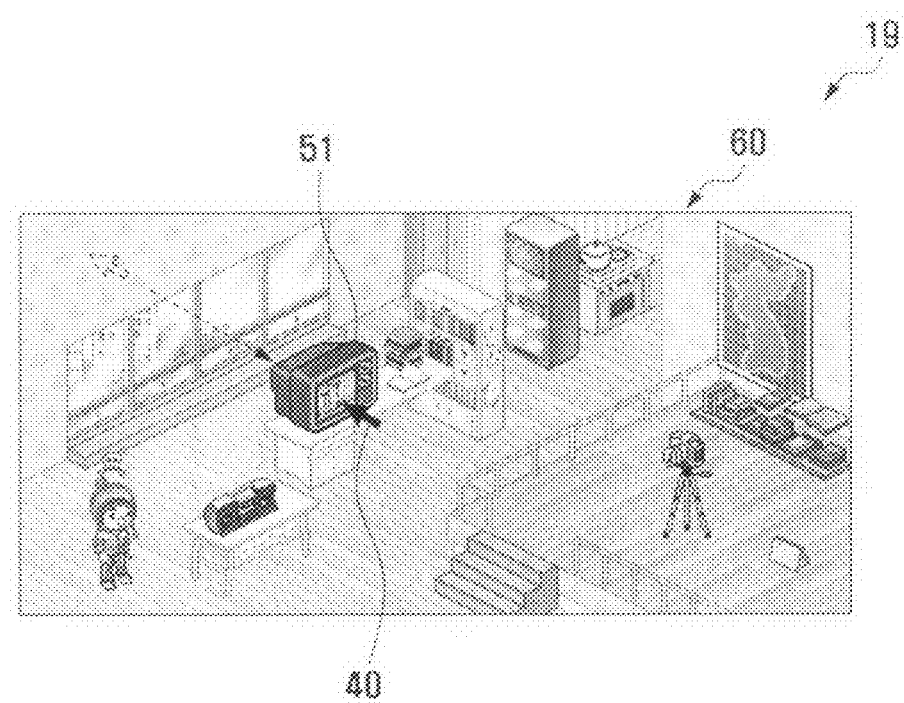
FIGS. 7 and 8 are examples of a standby screen illustrating a preview execution step in the process of FIG. 5.

For example, the pointer 40 is positioned at the television icon 51, as shown in FIG. 7.

Figure 8:
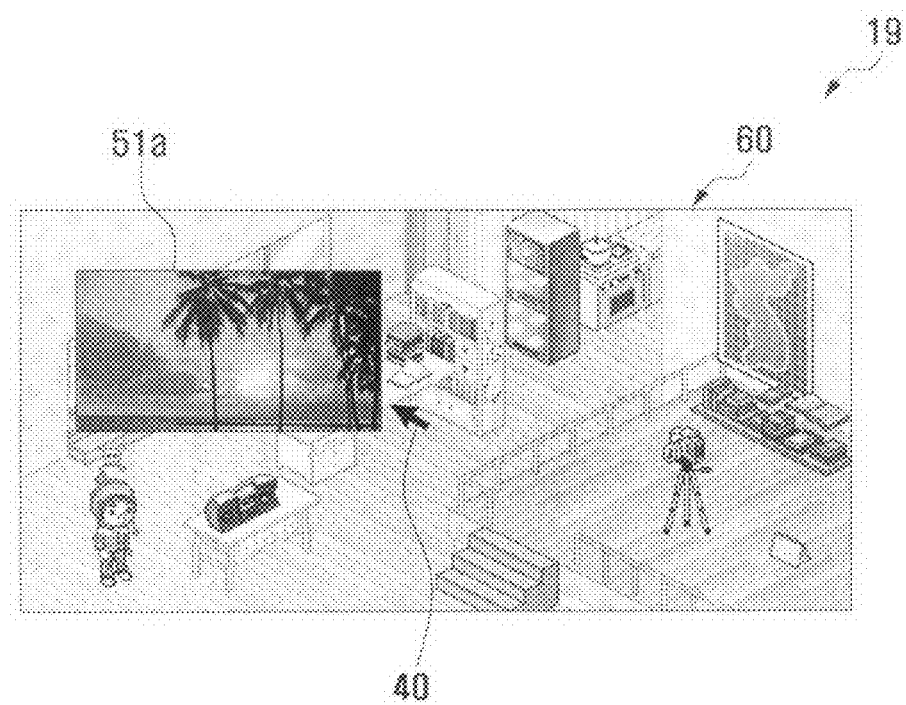

If the television icon 51 is selected, a preview 51a of an image of digital broadcasting is displayed in a PIP form, as shown in FIG. 8. Sound data of the digital broadcasting is output by the sound processor 23 through the speaker SPK.

The preview 51a is displayed on the standby screen 60. The preview 51a is displayed in an area having the selected television icon 51 at its center.

Next, one of the executed preview and a different function icon is selected using the pointer 40, in step S381.

Figure 9:
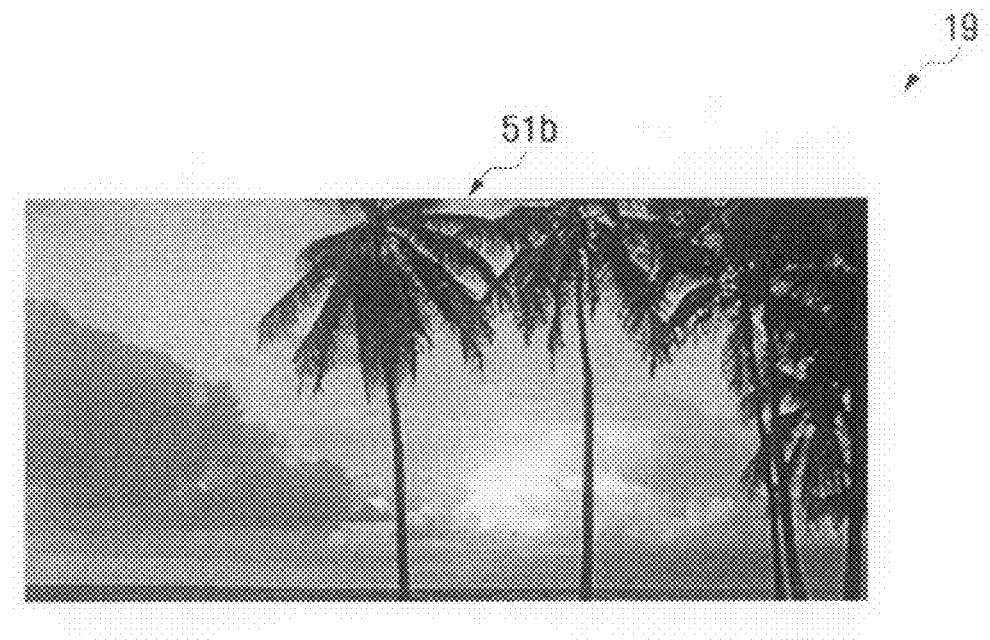
FIG. 9 is an example of an execution screen illustrating an execution screen conversion step in the process of FIG. 5.

If the executed preview is selected using the pointer 40, the controller 11 converts from the standby screen 60 to an execution screen having a function connected to the preview, in step S383. As shown in FIGS. 8 and 9, if the preview 51a is selected, the entire standby screen 60 is converted to the execution screen 51b for displaying a digital broadcasting image. Sound data of the digital broadcasting is output through the speaker SPK by the sound processor 23. The controller 11 hides the pointer 40 so that it is not displayed on the execution screen 51b.

Figure 10:
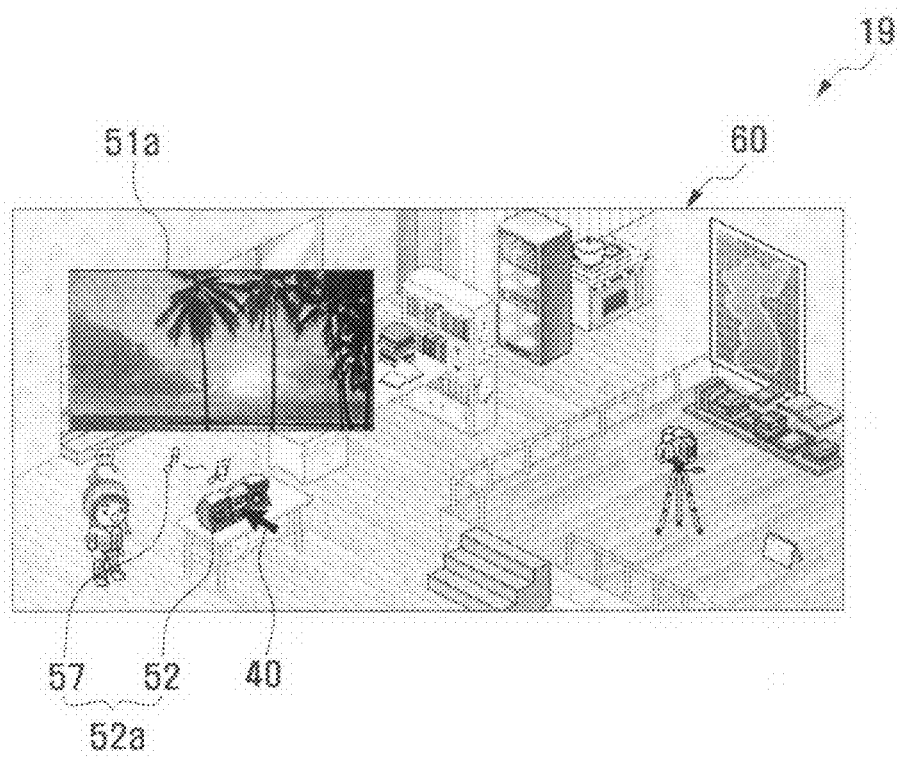
FIG. 10 is another example of a standby screen illustrating a preview execution step in the process of FIG. 5.

If a different function icon 50 having another function is selected using the pointer 40, the controller 11 returns to step S379 and executes a preview of the function connected to the selected different function icon 50. As shown in FIG. 10, if the radio icon 52 is selected, a preview 52a having a form in which the music icon 57 for displaying music is combined with the radio icon 52 is executed, a sound of the FM radio is output through the speaker SPK, and the output of the sound data of the digital broadcasting is suspended.

As described above, according to the present invention, a function icon connected to a function frequently used by a user is displayed on a standby screen, whereby the user can easily and quickly execute a function connected to a function icon on the standby screen by selecting the function icon, so that provision of a dedicated key can be minimized.

Because a function icon displayed on the standby screen has a shape of an item connected to the function, and has a preview function and a conversion function to a function execution screen, a function can be selected by the user's intuition, so that user convenience is provided and the function can be conveniently used.

By selecting a plurality of function icons, a plurality of functions can be simultaneously executed on the standby screen.

The user can compose an individual standby screen by selecting an image of the standby screen and function icons.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of executing a function on a display screen of a mobile terminal, the method comprising:
    displaying function icons on the display screen;
    selecting one of the displayed function icons;
    displaying a preview of a function corresponding to the selected function icon on the display screen; and
    executing the function corresponding to the preview by selecting the preview,
    wherein the display screen is configured to display a setting and each function icon is displayed as an item typically found in the setting,
    wherein executing the function corresponding to the preview by selecting the preview comprises converting from the display screen to a function execution screen.

2. The method of claim 1, wherein the setting includes at least one of a room, an office, a field, a restaurant, a theater, and a school.

3. The method of claim 1, wherein each function icon is related to a function of the mobile terminal, and has a shape of an item for decorating the setting and wherein the display screen displays a shape of the setting decorated with the items corresponding to the function icons.

4. The method of claim 1, wherein selecting one of the displayed function icons comprises selecting the function icon using a pointer displayed on the display screen.

5. The method of claim 1, wherein selecting one of the displayed function icons comprises selecting the function icon using a direction key moving a pointer between the function icons.

6. The method of claim 1, wherein the display screen is displayed on a touch screen and wherein selecting one of the displayed function icons comprises selecting the function icon by touching the touch screen.

7. The method of claim 1, wherein the preview of the function is displayed in an area having the selected function icon at its center.

8. The method of claim 6, wherein the preview of the function is displayed using one of a pop-up window and a Picture-In-Picture (PIP).

9. The method of claim 7, wherein the function icons are positioned on the display screen to display at least a part of each function icon that is not selected on the display screen.

10. The method of claim 8, wherein a plurality of previews are displayed on the display screen.

11. The method of claim 1, wherein each function icon corresponds to one of a digital broadcasting function, a Moving Picture Experts Group (MPEG)-1 Audio Layer 3 (MP3) player function, a radio function, a camera function, a voice communication function, a text messaging function, a Global Positioning System (GPS) navigation function, and a scheduler function.

12. A method of executing a function on a display screen of a mobile terminal, comprising:
    displaying the display screen having at least one function icon;
    selecting a displayed function icon;
    displaying a preview of a function corresponding to the selected function icon on the display screen;
    determining whether the displayed preview or another function icon is selected on the display screen; and
    when the displayed preview is selected on the display screen, executing the function corresponding to the selected preview and converting from the display screen to a function execution screen,
    wherein the display screen is configured to display a setting and each function icon is displayed as an item typically found in the setting.

13. The method of claim 12, wherein the setting includes at least one of a room, an office, a field, a restaurant, a theater, and a school.

14. The method of claim 12, further comprising when another function icon is selected on the display screen, displaying a preview of a function corresponding to the newly selected function icon on the display screen.

15. The method of claim 12, wherein the function icon and the preview are selected using a pointer displayed on the display screen.

16. The method of claim 12, wherein each function icon is related to a function of the mobile terminal, and has a shape of an item for decorating a room and wherein the display screen displays a shape of the room decorated with the items corresponding to the function icons.

17. The method of claim 12, wherein each function icon corresponds to one of a digital broadcasting function, a Moving Picture Experts Group (MPEG)-1 Audio Layer 3 (MP3) player function, a radio function, a camera function, a voice communication function, a text messaging function, a Global Positioning System (GPS) navigation function, and a scheduler function.

* * * * *